US012562530B2

(12) United States Patent
Wu et al.

(10) Patent No.: US 12,562,530 B2
(45) Date of Patent: Feb. 24, 2026

(54) ELECTRICAL PLUG CONNECTOR SNAP RELEASE STRUCTURE AND THE MATCHING ELECTRICAL SOCKET CONNECTOR

(71) Applicant: ACES ELECTRONICS CO., LTD., Taoyuan (TW)

(72) Inventors: Chu-Cheng Wu, Taoyuan (TW); Kuo-Hua Huang, Taoyuan (TW)

(73) Assignee: ACES ELECTRONICS CO., LTD., Taoyuan (TW)

( * ) Notice: Subject to any disclaimer, the term of this patent is extended or adjusted under 35 U.S.C. 154(b) by 289 days.

(21) Appl. No.: 18/357,692

(22) Filed: Jul. 24, 2023

(65) Prior Publication Data

US 2024/0429656 A1 Dec. 26, 2024

(30) Foreign Application Priority Data

Jun. 26, 2023 (TW) ................................ 112123710

(51) Int. Cl.
*H01R 13/635* (2006.01)
*H01R 12/72* (2011.01)

(52) U.S. Cl.
CPC ......... *H01R 13/635* (2013.01); *H01R 12/722* (2013.01)

(58) Field of Classification Search
CPC ............... H01R 13/635; H01R 12/722; H01R 13/6335; H01R 12/75; H01R 13/504; H01R 12/73; H01R 12/721; H01R 13/6275; H01R 13/639; H01R 13/40; H01R 13/502; H01R 13/633
See application file for complete search history.

(56) References Cited

U.S. PATENT DOCUMENTS

| | | | | |
|---|---|---|---|---|
| 7,422,457 B1 * | 9/2008 | Wu | ...................... | G02B 6/4261 439/258 |
| 7,429,185 B1 * | 9/2008 | Wu | .................... | H01R 13/6275 439/372 |
| 2011/0294333 A1 * | 12/2011 | Wu | .................... | H01R 13/6335 439/345 |
| 2024/0429666 A1 * | 12/2024 | Wu | ...................... | H01R 13/405 |
| 2025/0047039 A1 * | 2/2025 | Lai | ..................... | H01R 13/6335 |

* cited by examiner

*Primary Examiner* — Travis S Chambers
(74) *Attorney, Agent, or Firm* — Muncy, Geissler, Olds & Lowe, P.C.

(57) ABSTRACT

The invention discloses an electrical plug connector snap release structure, which includes a plug connector, a sliding seat, a draw belt and a buckle assembly, and a matching electrical socket connector. When the plug connector is docked with the socket connector, each supporting spring leaf of the buckle assembly supports down to the holder base of the plug connector, so that the support arms of the buckle assembly force the hook portions thereof to hook in the respective hook holes of the socket connector. When pressing the pressing surface of the buckle assembly or when the draw belt is driven to pull the sliding seat, the supporting spring leaves are elastically deformed and the hook portions are disengaged from the hook holes, allowing the plug connector to be easily disconnected from the socket connector.

10 Claims, 5 Drawing Sheets

ELECTRICAL PLUG CONNECTOR SNAP RELEASE STRUCTURE AND THE MATCHING ELECTRICAL SOCKET CONNECTOR

This application claims the priority benefit of Taiwan patent application number 112123710, filed on Jun. 26, 2023.

BACKGROUND OF THE INVENTION

1. Field of the Invention

The present invention relates to electrical connector technology and more particularly, to an electrical plug connector snap release structure, which includes a plug connector with a holder base for the connection of a matching electrical socket connector, a sliding seat with a draw belt, and a buckle assembly. By pressing the buckle assembly or pulling the draw belt, the connected matching electrical socket connector can be unlocked from the electrical plug connector.

2. Description of the Related Art

Today's computer technology is growing at an ever-changing speed, and the development trend of computer is also moving towards the direction of powerful computing functions, fast speed and small size, so that the number of computer communication connection ports is also reduced accordingly. This kind of communication connection port may also be used on other equipment with the same specification, such as car audio, car computer, charging device, satellite navigation, communication device, etc. However, in addition to sockets, the communication connection ports in these devices are cable plugs that combine cables with plugs. Therefore, the future development of this type of cable plug is also rising. However, the size of this kind of cable plug is getting smaller and smaller. In terms of the overall structural configuration, it is important how to use a good structural design so that the cable plug does not directly pull the cable when it is plugged in and out, and also avoids the situation that the cable plug and socket connector are too small and easy to be damaged. In addition, without any supporting or fixing structure for the plug, it is easy to cause the cable plug to be pulled and fall off after being inserted into the socket, thereby affecting the transmission of signals. Therefore, in the above detailed description, it can be found that in the design of the cable plug, the main consideration can be to ensure the stability of the cable plug when it is docked with the socket connector. In addition, it should be noted that the plug is exposed when it is connected with the cable. During use, it should be avoided to pull the wire to make the plug come off. Therefore, in view of the lack of the above-mentioned conventional designs, it is necessary to further research and development by the relevant industry to improve the deficiencies of the conventional designs.

SUMMARY OF THE INVENTION

Therefore, in view of the above-mentioned problems and deficiencies, the inventor collected relevant information, and after various evaluations and considerations, he designed this electrical plug connector snap release structure and the matching electrical socket connector.

The main object of the present invention is to provide an electrical plug connector snap release structure and a matching electrical socket connector. The electrical plug connector snap release structure comprises an electrical plug connector, a sliding seat, a draw belt, and a buckle assembly. The electrical plug connector comprises a docking terminal set in a holder base thereof. The front of the holder base is a docking portion and a mounting surface on the rear side of the docking portion, and a housing is provided to accommodate the holder base. The housing has two perforations respectively and bilaterally provided above the docking portion. The sliding seat comprises a seat body installed on the mounting surface in a sliding manner, and at least one elastic portion formed on the rear side of the seat body. The draw belt is combined with the seat body. The buckle assembly is pivotally connected to the holder base. The buckle assembly comprises a pressing surface placed on the mounting surface and located at a rear side relative to the seat body of the sliding seat, two support arms respectively extended from two opposite lateral sides of the pressing surface in the same direction, a hook portion protruding upwards from a suspending front end of each support arm, and two supporting spring leaves supported on the holder base in such a manner that when the pressing surface is pressed, the supporting spring leaves are elastically deformed and the hook portions of the two support arms are shifted downward by a distance from the perforations, and when the draw belt is driven to pull the sliding seat, the at least one elastic portion elastically deforms and also drives the hook portions of the two support arms to elastically deflect downward from the perforations.

It is another object of the present invention to provide an electrical plug connector snap release structure and a matching electrical socket connector. The electrical plug connector snap release structure comprises an electrical plug connector, a sliding seat, a draw belt, and a buckle assembly. The electrical plug connector comprises a docking terminal set in a holder base thereof. The front of the holder base is a docking portion and a mounting surface on the rear side of the docking portion, and a housing is provided to accommodate the holder base. The housing has two perforations respectively and bilaterally provided above the docking portion. The sliding seat comprises a seat body installed on the mounting surface in a sliding manner, and at least one elastic portion formed on the rear side of the seat body. The draw belt is combined with the seat body. The buckle assembly is pivotally connected to the holder base. The buckle assembly comprises a pressing surface placed on the mounting surface and located at a rear side relative to the seat body of the sliding seat, two support arms respectively extended from two opposite lateral sides of the pressing surface in the same direction, a hook portion protruding upwards from a suspending front end of each support arm, and two supporting spring leaves supported on the holder base. When the docking portion of the plug connector of the present invention is inserted into the socket portion of the matching electrical socket connector to form an electrical connection, the two supporting spring leaves are supported downward against the limiting portions, and the hook portions of the two support arms are elastically upward to force the two hook portions into engagement with the respective hook holes that are bilaterally located on the top surface of the socket portion to form a positioning. When pressing the pressing surface to unlock, the supporting spring leaves can be elastically deformed and the hook portions of the two support arms can be shifted downward by a distance from the perforations. At this time, the two hook portions are separated from the hook holes of the socket portion of the socket connector, and descended into the perforations of the housing, so that the plug connector can be easily separated from the electrical connection of the socket connector. And when the draw belt pulls the sliding seat to make the elastic portions elastically deform, it can also link the hook portions of the two support arms to elastically deflect downward from the perforations and break away from the hook holes.

DETAILED DESCRIPTION OF THE PREFERRED EMBODIMENT

Figure 1:
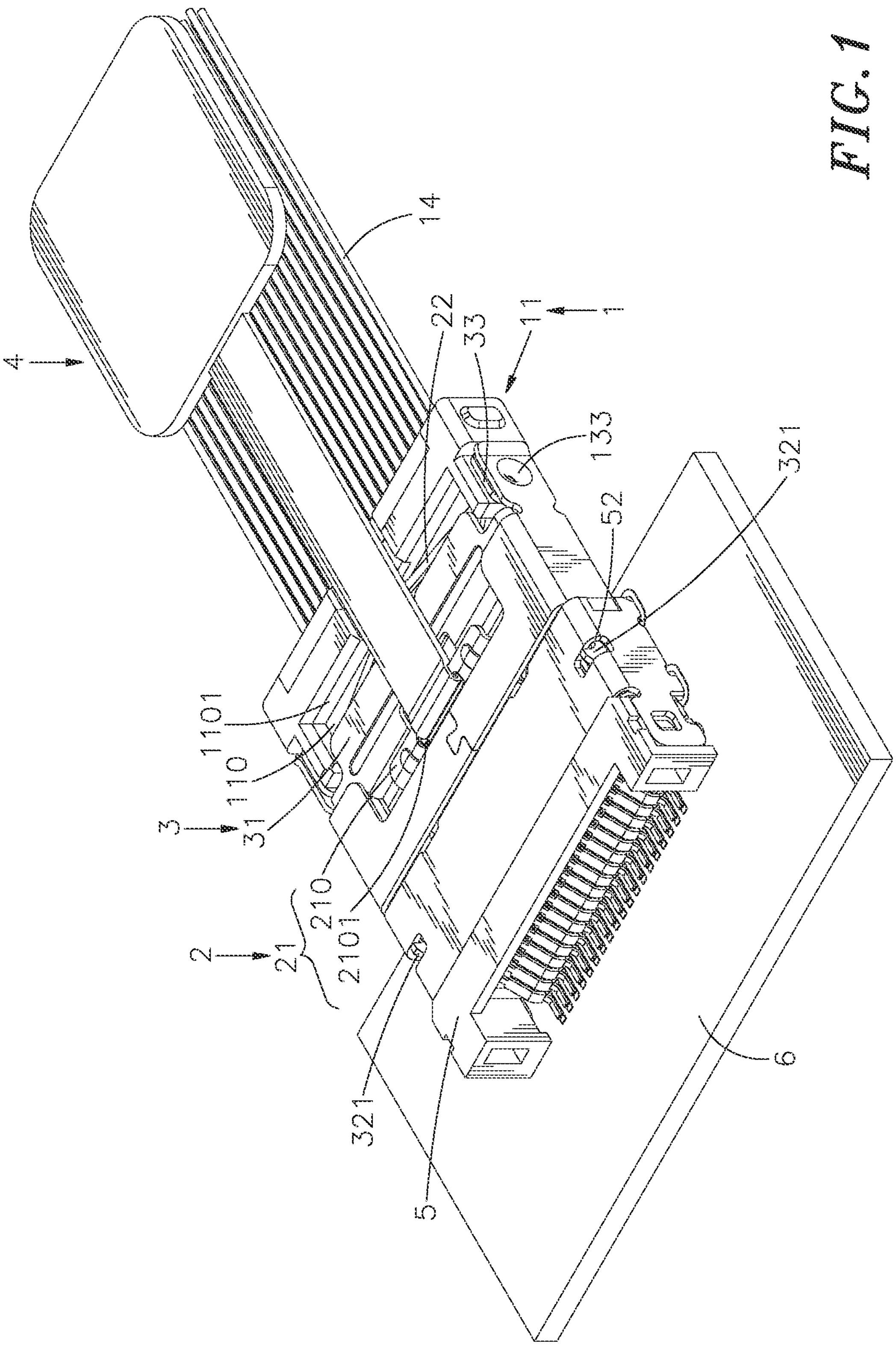
FIG. 1 is a perspective view of the combination of electrical plug connector snap release structure and the matching electrical socket connector of the present invention.

In order to achieve the above-mentioned purpose and effect, the features and functions of the technical means and structure adopted by the present invention are hereby drawn to describe in detail by way of a preferred embodiment as follows, so as to facilitate a complete understanding of the present invention.

Please refer to FIGS. 1-4, which are a perspective view of the combination of the electrical plug connector snap release structure and the matching electrical socket connector of the present invention, an exploded perspective view of the combination of the electrical plug connector snap release structure and the matching electrical socket connector of the present invention, an exploded perspective view of the electrical plug connector snap release structure of the present invention and another exploded perspective view of the electrical plug connector snap release structure of the present invention. As shown in the figures, it can be clearly seen that the electrical plug connector snap release structure of the present invention comprises a plug connector 1, a sliding seat 2, a buckle assembly 3, and a draw belt 4.

The plug connector 1 comprises a holder base 11, a circuit board-based docking terminal set 12 set in the holder base 11, a housing 13 accommodating the holder base 11, and wires 14 welded to the docking terminal set 12. The holder base 11 comprises a docking portion 111 located on a front side, a mounting surface 110 and a stopper 1101 sequentially formed an upper surface thereof at a rear side of the docking portion 111, and two positioning structures 112 respectively formed on both sides of the mounting surface 110. Each positioning structure 112 is sequentially provided with a limiting portion 1121, a convex rail 1122 and a pivoting portion 1123 from the docking portion 111 toward an opposing rear side of the holder base 11. The housing 13 comprises a locating space 130 formed in the center thereof for accommodating and positioning the holder base 11, two limiting grooves 131 respectively formed on two sides of the locating space 130, a perforation 132 respectively provided on an upper surface of each of the limiting grooves 131, and two limiting shaft portions 133 respectively provided on two opposite sidewalls thereof.

The sliding seat 2 comprises a seat body 21 coupled with the positioning structures 112 and installed on the mounting surface 110 in a position-limiting sliding manner, and two elastic portions 22 of continuous turning S-shaped elastic pieces integrally and bilaterally formed on a rear side of the seat body 21. The seat body 21 comprises a moving portion 210, a through hole 2101 located on the moving portion 210 for the mounting of the draw belt 4, two rail panels 211 perpendicularly extended from two opposite lateral sides thereof, and a rail hole 2110 located on each of the rail panels 211 and coupled to one respective convex rail 1122.

The buckle assembly 3 is pivotally positioned on the positioning structures 112 of the docking terminal set 12 of the plug connector 1, comprising a pressing surface 31 placed on the mounting surface 110 and movable by the moving portion 210 of the seat body 21 of the sliding seat 2, a notch 310 slightly larger than the draw belt 4 and located on a front side of the pressing surface 31, two support arms 32 respectively extended from two opposite lateral sides of the pressing surface 31 in the same direction, a hook portion 321 protruding upwards from a suspending front end of each support arm 32, two supporting spring leaves 322 respectively provided below the hook portions 321 and the support arms 32 to support up the support arms 32 to maintain a vertically upward elastic preload, and two rotating portions 33 respectively formed on opposing rear ends of the two support arms 32 outside the pressing surface 31 and respectively coupled to the pivoting portions 1123 of the positioning structures 112 of the holder base 11 of the plug connector 1.

Furthermore, when assembling the present invention, the draw belt 4 is wound and fixed on the through hole 2101 of the sliding seat 2 first, then place the seat body 21 of the sliding seat 2 on the mounting surface 110 of the holder base 11. At the same time, the rail holes 2110 of the rail panels 211 on both sides of the seat body 21 are respectively and limitedly fitted on the convex rails 1122 to form a position, and the suspending ends of the elastic portions 22 integrally and bilaterally formed on the rear side of the seat body 21 are abutted against the stopper 1101 of the holder base 11 of the plug connector 1. Then place the pressing surface 31 of the buckle assembly 3 on the mounting surface 110 and behind the seat body 21 of the sliding seat 2 to pivotally position the rotating portions 33 of the buckle assembly 3 between the pivoting portions 1123 of the positioning structures 112 and the limiting shaft portions 133 of the housing 13, and to install the hook portions 321 and the supporting spring leaves 322 of the buckle assembly 3 at the respective limiting portions 1121. Then put the locating space 130 in the center of the housing 13 onto the docking portion 111 until the docking portion 111 is set in the relatively concave limiting grooves 131, so that the limiting shaft portions 133 are put into the rotating portions 33 and fitted on the pivoting portions 1123 to form a position, and at the same time, the two hook portions 321 are located at the limiting portions 1121 of the positioning structures 112 and pass through the perforations 132 at the top of the housing 13. At this time, the supporting spring leaves 322 are supported downward against the limiting portions 1121 to force the two hook portions 321 on the two support arms 32 into an upward elastic pre-stressed state, and the overall structure of the plug connector of the present invention can be completed.

Please refer to FIGS. 1-4. The matching socket connector 5 is soldered on a circuit board 6. The socket connector 5 comprises socket portion 51, and two hook holes 52 bilaterally located on a top surface of the socket portion 51 for the hook portions 321 of the two support arms 32 to be snapped into position.

Figure 2:
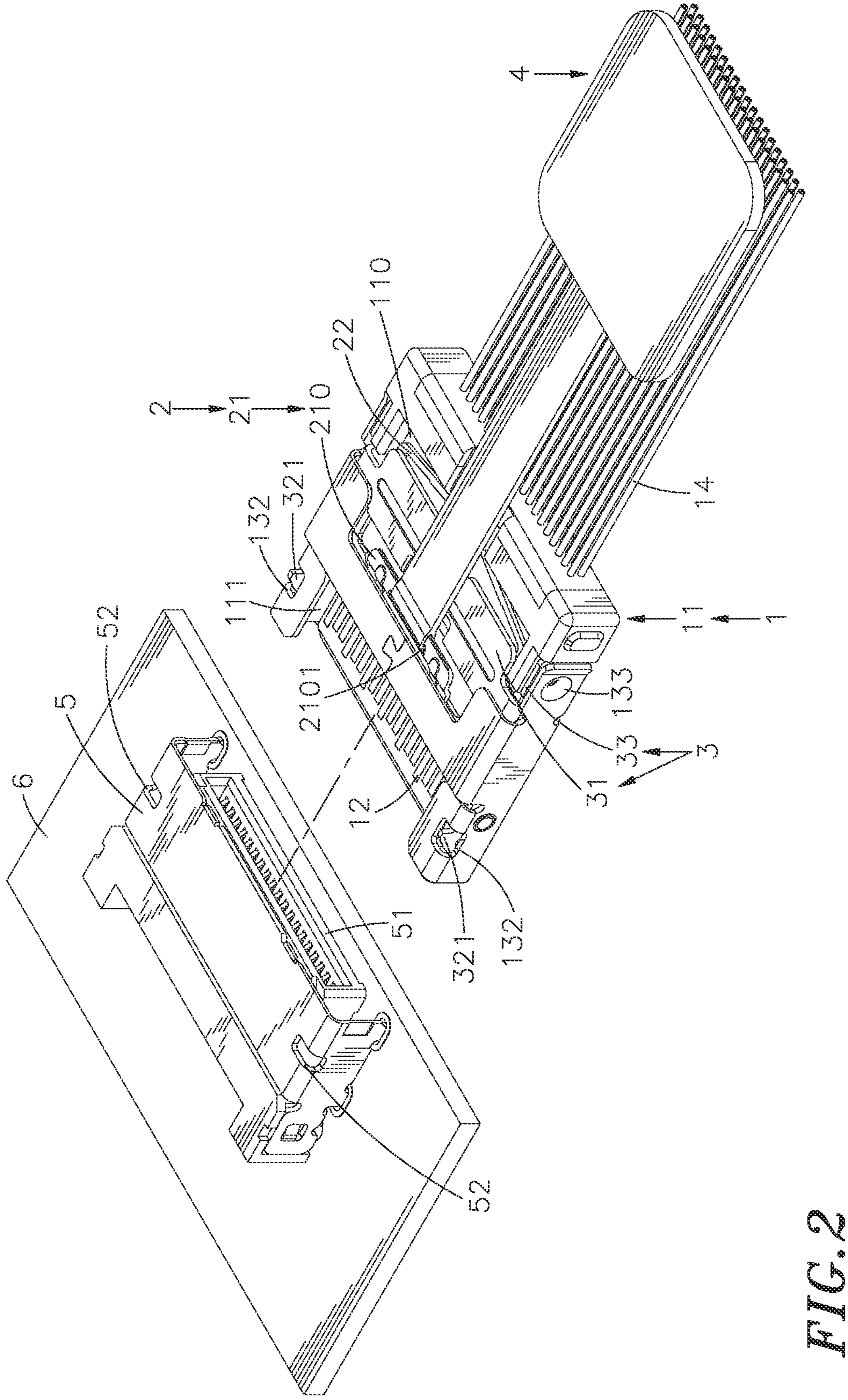
FIG. 2 is an exploded perspective view of the combination of the electrical plug connector snap release structure and the matching electrical socket connector of the present invention.
Figure 5:
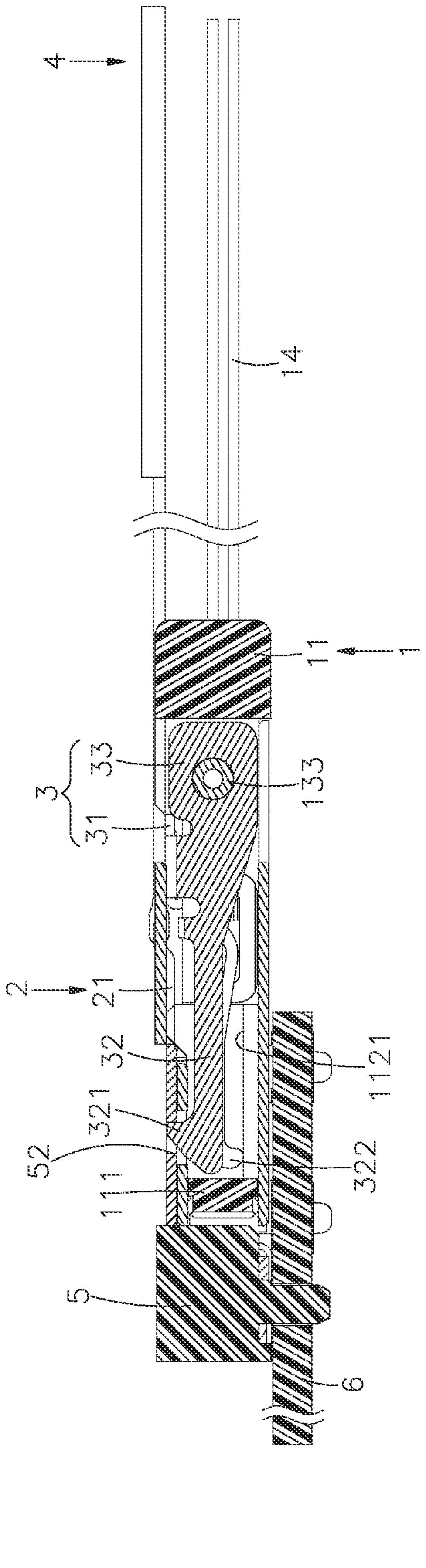
FIG. 5 is a side sectional view of the combination of the electrical plug connector snap release structure and the matching electrical socket connector of the present invention.

Please refer to FIGS. 2 and 5, which are an exploded perspective view and a side sectional view of the electrical plug connector snap release structure of the present invention. It can be clearly seen from the figures that when the present invention is locked, the docking portion 111 of the plug connector 1 of the present invention is first inserted into the socket portion 51 of the socket connector 5 to form an electrical connection. At this time, the two supporting spring leaves 322 are supported downward against the limiting portions 1121, and the hook portions 321 of the two supporting arms 32 are held in an upward elastic pre-stressed state and snapped into the respective hook holes 52 to form a position.

Please refer to FIG. 5. It can be clearly seen from the figure that the present invention has two unlocking methods. The first unlocking method is to press the pressing surface 31 of the buckle assembly 3, that is, the rotating portions 33 can be used as the axis point to make the supporting spring leaves 322 support downward against the limiting portion 1121 to elastically deform, and the pressing surface 31, two support arms 32 and hook portions 321 of the buckle assembly 3 are flexibly shifted downward by a distance in the space of the mounting surface 110. At this time, the two hook portions 321 are separated from the hook holes 52 on the socket portion 51 of the socket connector 5 and descend to the perforations 132 of the housing 13, so that the plug connector 1 can be easily separated from the electrical connection of the socket connector 5. The second unlocking method is to pull the draw belt 4 at the through hole 2101 to cause the elastic portions 22 of the sliding seat 2 to be squeezed and elastically deformed at the mounting surface 110 and to make the moving portion 210 push the pressing surface 31 so that the two support arms 32 and the hook portions 321 elastically offset a distance downward in the space of the mounting surface 110, and the two hook portions 321 can be separated from the hook holes 52 on the socket portion 51 of the socket connector 5 and descend to the perforations 132 of the housing 13. This method also allows the plug connector 1 to be easily disconnected from the electrical connection of the socket connector 5.

Figure 3:
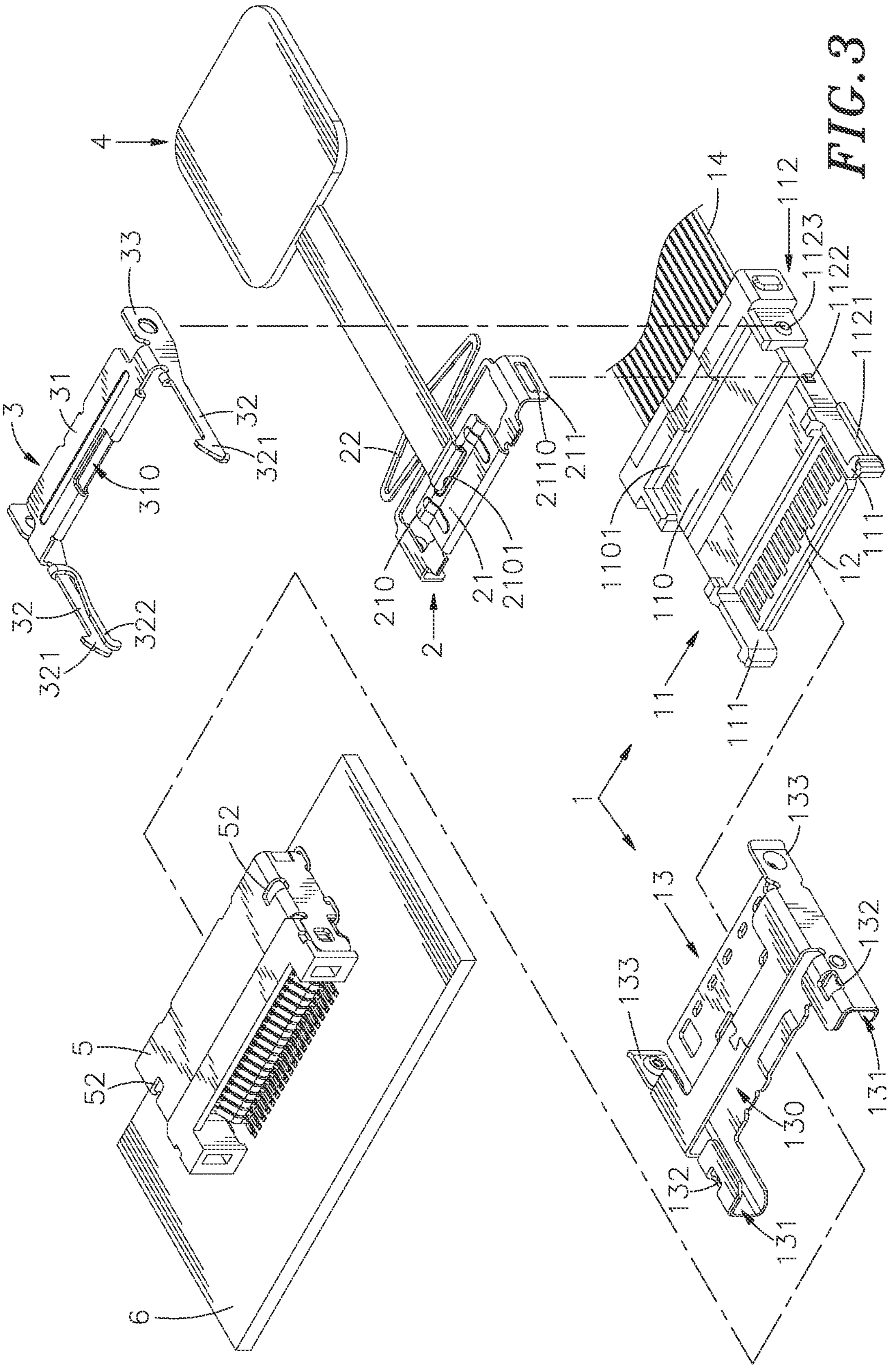
FIG. 3 is an exploded perspective view of the combination of the electrical plug connector snap release structure and the matching electrical socket connector of the present invention.
Figure 4:
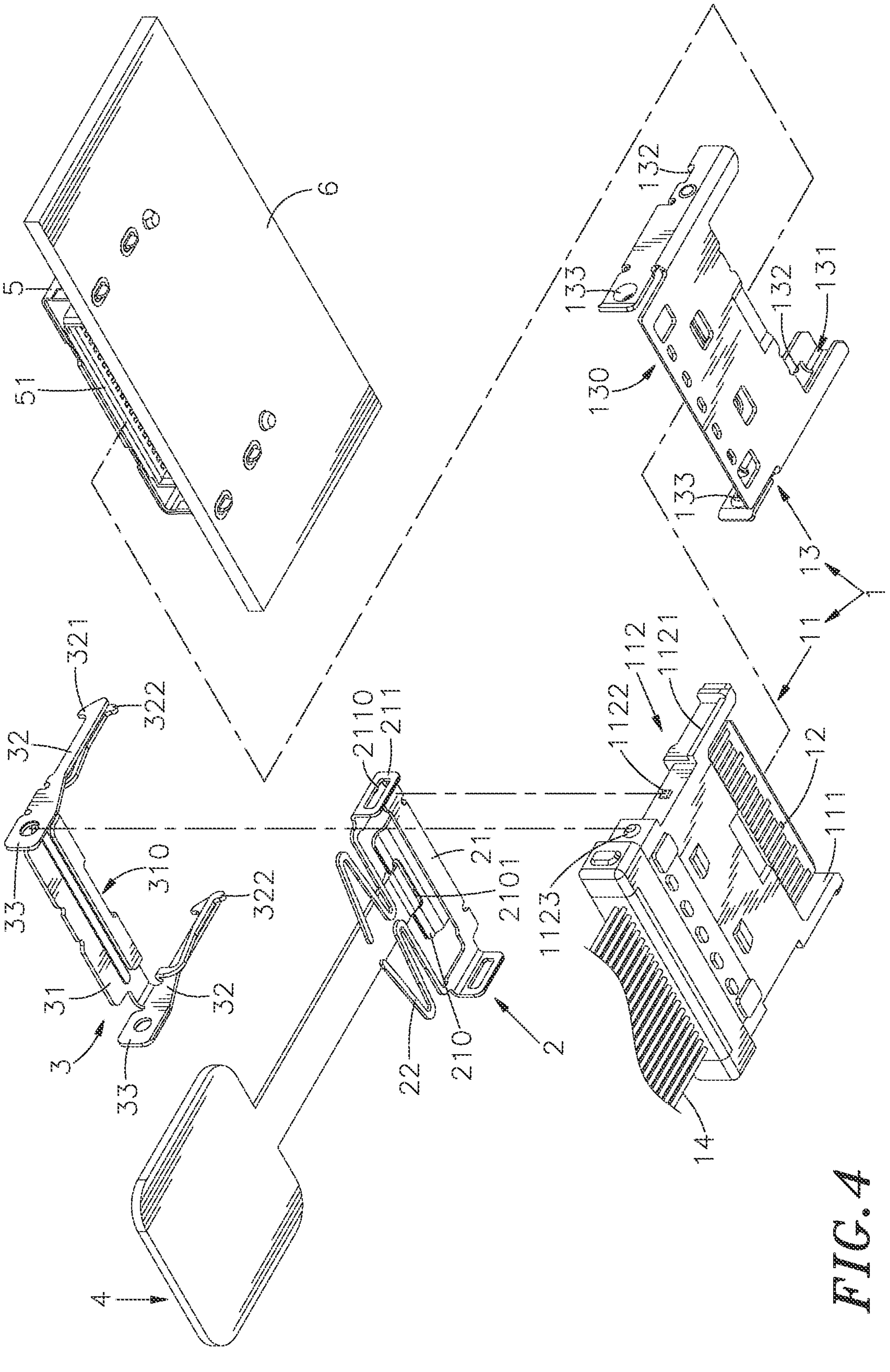
FIG. 4 is similar to FIG. 3 when viewed from another angle.

Please refer to FIGS. 3-5, which are an exploded perspective view, another exploded perspective view and a side sectional view of the electrical plug connector snap release structure of the present invention. It can be clearly seen from the figures that the two support arms 32 are respectively extended from two opposite lateral sides of the pressing surface 31 in the same direction, and the two supporting spring leaves 322 are respectively suspending below the hook portions 321 and the support arms 32 to support up the support arms 32. In this way, the two support arms 32 are aligned and spaced up and down between the hook portions 321 and the supporting spring leaves 322, so that when the two supporting spring leaves 322 elastically support downward against the limiting portions 1121, the hook portions 321 of the two support arms 32 above the two supporting spring leaves 322 are stable to maintain a vertically upward elastic preload. However, the two supporting spring leaves 322 only need to have the hook portions 321 of the two supporting arms 32 to maintain the vertically upward elastic preload when the pressing surface 31 is not pressed or the draw belt 4 is not pulled. The simple and equal changes and modifications of the positions of the two supporting spring leaves 322 do not limit the protection scope of the present invention, and are hereby stated.

In addition, in the preferred embodiment of the present invention, the elastic portions 22 of continuous turning S-shaped elastic pieces are integrally and bilaterally formed on the rear side of the seat body 21 of the sliding seat 2, respectively. However, the number of elastic portion 22 can be set at least one, so that the sliding seat 2 can form a sliding state on the holder base 11 through the at least one elastic portion 22 with telescopic displacement. The S-shaped elastic piece forming the elastic portion 22 can be formed in a “Z” shape or an “8” shape. The elastic portion 22 can also be formed by extending the elastic piece in the sliding seat 2. Therefore, the elastic portion 22 only needs to have a shape with elastic deformation and reset functions. Such simple and equal changes and modifications do not limit the protection scope of the present invention, and are hereby stated.

In addition, in this embodiment, the center of the docking portion 111 of the plug connector 1 is a circuit board-type docking terminal set 12, so that the docking terminal set 12 can be used as an electrical connection with the socket connector 5. Therefore, the docking terminal set 12 in the docking portion 111 of the plug connector 1 is not necessarily designed in the form of a circuit board, but can also be designed in the form of other plural terminals or conductive strips to form a cable combined plug or any cable connector for socket connector use. Such simple equal changes and modifications do not limit the protection scope of the present invention, and such simple equal changes and modifications should still be included in the patent scope covered by the present invention.

In addition, in this embodiment, the rotating portions 33 of the buckle assembly 3 of the plug connector 1 are combined with the pivoting portions 1123 of the holder base 11, and then the housing 13 is assembled on the holder base 11, and the limiting shaft portions 133 of the housing 13 are assembled at the pivoting portions 1123 so that the buckle assembly 3 forms an axial limit and pivots in a swinging state with the pivoting portions 1123 as the axis. The buckle assembly 3 can also be independently assembled on the pivoting portions 1123 of the holder base 11 or on the limiting shaft portions 133 of the housing 13 in a swinging state. Such simple equal changes and modifications do not limit the protection scope of the present invention, and such simple equal changes and modifications should still be included in the patent scope covered by the present invention.

In addition, the present invention mainly aims at the feature that pressing the pressing surface 31 enables the supporting spring leaves 322 to be elastically deformed to move the hook portions 321 of the two support arms 32 downward by a distance, and the feature that when the draw belt 4 pulls the sliding seat 2 to elastically deform the elastic portions 22, the hook portions 321 of the two support arms 32 are elastically deflected downward. In this way, the seat body 21 of the plug connector 1 can be stably connected to the corresponding socket connector 5 and the action can be confirmed.

However, the above detailed description is only for the description of a preferred feasible embodiment of the present invention, this embodiment is not used to limit the scope of the patent application of the present invention. All other equivalent changes and modifications completed without departing from the technical spirit disclosed in the present invention shall be included in the patent scope covered by the present invention.

What the invention claimed is:

1. An electrical plug connector snap release structure, comprising:

a plug connector comprising a holder base, a docking terminal set mounted in said holder base and a housing accommodating said holder base, said holder base comprising a docking portion located on a front side thereof, a mounting surface formed an upper surface thereof at a rear side of said docking portion, said housing comprising two perforations respectively and bilaterally provided above said docking portion;

a sliding seat comprising a seat body installed on said mounting surface in a sliding manner, and at least one elastic portion formed on a rear side of said seat body, wherein the at least one elastic portion includes a suspending end abutted against the holder base of the plug connector and a connecting end coupled with the rear side of said seat body;

a draw belt combined with said seat body; and a buckle assembly pivotally positioned between said holder base and said housing, said buckle assembly comprising a pressing surface placed on said mounting surface and located at a rear side relative to said seat body of said sliding seat, two support arms respectively extended from two opposite lateral sides of said pressing surface in the same direction, a hook portion protruding upwards from a suspending front end of each said support arm, and two supporting spring leaves supported on said holder base in such a manner that when said pressing surface is pressed, said supporting spring leaves are elastically deformed and said hook portions of said two support arms are shifted downward by a distance from said perforations, and when said draw belt is driven to pull said sliding seat, said at least one elastic portion elastically deforms and also drives said hook portions of said two support arms to elastically deflect downward from said perforations.

2. The electrical plug connector snap release structure as claimed in claim 1, wherein said holder base of said plug connector further comprises a stopper formed on said mounting surface for said at least one elastic portion formed on the rear side of said seat body of said sliding seat to support.

3. The electrical plug connector snap release structure as claimed in claim 1, wherein said housing comprises two limiting shaft portions respectively provided on two opposite sidewalls thereof.

4. The electrical plug connector snap release structure as claimed in claim 1, wherein said seat body of said sliding seat is provided with a moving portion for said draw belt to be combined in a through hole to form a positioning.

5. The electrical plug connector snap release structure as claimed in claim 1, wherein each said elastic portion of said sliding seat is a continuous turning S-shaped elastic piece.

6. A socket connector that cooperates with said plug connector of said electrical plug connector snap release structure as claimed in claim 1, said socket connector comprising a socket portion for said docking portion of said plug connector to be inserted to form an electrical connection, and two hook holes bilaterally located on a top surface of said socket portion for said hook portions of said buckle assembly to be snapped into position.

7. The electrical plug connector snap release structure as claimed in claim 1, wherein said holder base further comprises two positioning structures respectively formed on two opposite lateral sides of said mounting surface for the combination of said sliding seat and the pivotal positioning of said buckle assembly; said two supporting spring leaves are respectively extended from a bottom side of said pressing surface below said hook portions and said support arms.

8. The electrical plug connector snap release structure as claimed in claim 7, wherein each said positioning structure comprises a limiting portion for one respective said supporting spring leaf to be supported.

9. The electrical plug connector snap release structure as claimed in claim 7, wherein each said positioning structure comprises a convex rail; said seat body further comprises two rail panels perpendicularly extended from two opposite lateral sides thereof, and a rail hole located on each of said rail panels and coupled to said convex rail of one respective said positioning structure.

10. The electrical plug connector snap release structure as claimed in claim 7, wherein each said positioning structure comprises a pivoting portion; said buckle assembly further comprises two rotating portions respectively formed on opposing rear ends of said two support arms outside said pressing surface and respectively coupled to said pivoting portions of said positioning structures of said holder base of said plug connector.

* * * * *